(12) United States Patent
Wada et al.

(10) Patent No.: US 12,134,300 B2
(45) Date of Patent: Nov. 5, 2024

(54) HEAT CONTROL DEVICE AND HEAT CONTROL METHOD

(71) Applicants: TOYOTA JIDOSHA KABUSHIKI KAISHA, Toyota (JP); DENSO CORPORATION, Kariya (JP)

(72) Inventors: Ryuichi Wada, Nagoya (JP); Tatsuya Masuhisa, Anjo (JP); Nobukazu Kuribayashi, Kariya (JP); Shinsaku Isomura, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 413 days.

(21) Appl. No.: 17/441,928

(22) PCT Filed: Mar. 23, 2020

(86) PCT No.: PCT/IB2020/000106
§ 371 (c)(1),
(2) Date: Sep. 22, 2021

(87) PCT Pub. No.: WO2020/194044
PCT Pub. Date: Oct. 1, 2020

(65) Prior Publication Data
US 2022/0161629 A1  May 26, 2022

(30) Foreign Application Priority Data
Mar. 25, 2019 (JP) ................ 2019-057210

(51) Int. Cl.
*B60H 1/00* (2006.01)
*B60H 1/32* (2006.01)

(52) U.S. Cl.
CPC ....... *B60H 1/0073* (2019.05); *B60H 1/00278* (2013.01); *B60H 1/00885* (2013.01);
(Continued)

(58) Field of Classification Search
CPC .......... B60H 2001/00949; B60H 2001/00307; B60H 1/3208; B60H 1/00899; B60H 1/00885; B60H 1/00278; B60H 1/0073
See application file for complete search history.

(56) References Cited

U.S. PATENT DOCUMENTS 6,634,229 B1 * 10/2003 Kazkaz ................. G01F 23/243
 73/304 R
6,637,229 B1 10/2003 Forrest et al.
(Continued)

FOREIGN PATENT DOCUMENTS

CN 103260917 A 8/2013
FR 2 864 149 A1 6/2005
(Continued)

OTHER PUBLICATIONS

International Search Report issued on Jul. 8, 2020 in PCT/IB2020/000106 filed Mar. 23, 2020, 2 pages.

*Primary Examiner* — Nael N Babaa
(74) *Attorney, Agent, or Firm* — Oblon, McClelland, Maier & Neustadt, L.L.P.

(57) ABSTRACT

A heat control device is provided in a vehicle including a first thermal circuit that circulates a coolant and a second thermal circuit that circulates a refrigerant while changing the state of the refrigerant and is able to exchange heat with the first thermal circuit. When there is a heat discharge request from the second thermal circuit, the heat control device includes a determination unit configured to determine an amount of operation of each of a plurality of units which are used to discharge heat such that the heat discharge request is satisfied and the sum of power consumption values of the plurality of units is minimized.

4 Claims, 6 Drawing Sheets

(52) U.S. Cl.
CPC ....... *B60H 1/00899* (2013.01); *B60H 1/3208* (2013.01); *B60H 2001/00307* (2013.01); *B60H 2001/00949* (2013.01)

(56) References Cited

U.S. PATENT DOCUMENTS

2013/0255296 A1   10/2013  Kardos et al.
2016/0257179 A1*   9/2016  Miyakoshi ......... B60H 1/00921
2017/0021698 A1   1/2017  Hatakeyama et al.

FOREIGN PATENT DOCUMENTS

| | | |
|---|---|---|
| JP | 2015-186989 A | 10/2015 |
| WO | WO 2012/082050 A1 | 6/2012 |
| WO | WO 2018/009122 A1 | 1/2018 |

\* cited by examiner

HEAT CONTROL DEVICE AND HEAT CONTROL METHOD

BACKGROUND OF THE INVENTION

1. Field of the Invention

The invention relates to a heat control device and a heat control method.

2. Description of Related Art

Japanese Patent Application Publication No. 2015-186989 (JP 2015-186989 A) discloses a vehicular air-conditioner that includes a refrigeration circuit, a low coolant-temperature circuit, and a high coolant-temperature circuit. The vehicular air-conditioner enables the refrigeration circuit and the high coolant-temperature circuit to exchange heat with each other via a condenser, and enables the refrigeration circuit and the low coolant-temperature circuit to exchange heat with each other via a refrigerant-coolant heat exchanger. In the vehicular air conditioner described in JP 2015-186989 A, improvement in efficiency of the refrigeration circuit can be achieved by providing a subcooling (SC) condenser that can exchange heat between the refrigeration circuit and the low coolant-temperature circuit and promoting cooling of a refrigerant of the refrigeration circuit using the SC condenser.

SUMMARY OF THE INVENTION

In the vehicular air conditioner described in JP 2015-186989 A, heat can be transferred between the refrigeration circuit and the high coolant-temperature circuit by driving a compressor of the refrigeration circuit or a water pump of the high coolant-temperature circuit. However, when the compressor or the water pump is driven, power consumption thereof is not considered at all and thus there is a possibility that electric power in the whole vehicle will be wasted.

Therefore, the invention provides a heat control device and a heat control method that enable a predetermined amount of heat from a thermal circuit for cooling a passenger compartment to be transferred to a thermal circuit for circulating a coolant and enable power consumption which is required for transfer of heat to be reduced.

A heat control device according to a first aspect of the invention is mounted in a vehicle including a first thermal circuit including a water pump configured to circulate a coolant, a radiator configured to radiate heat of the coolant to the outside of the vehicle, and a radiator fan configured to increase an amount of air passing through the radiator and a second thermal circuit including a compressor configured to circulate a refrigerant while changing a state of the refrigerant and to exchange heat with the first thermal circuit. The heat control device includes: a first calculation unit configured to calculate an amount of absorbed heat which is requested by the first thermal circuit and an amount of discharge heat which is requested to be discharged from the second thermal circuit to the first thermal circuit; a determination unit configured to determine whether to radiate the heat from the radiator to the outside of the vehicle; a second calculation unit configured to, when the determination unit determines to radiate the heat from the radiator to the outside of the vehicle, calculate an amount of radiated heat which is requested for the radiator based on the amount of absorbed heat requested by the first thermal circuit and the amount of discharged heat requested by the second thermal circuit; and a decision unit configured to, when the determination unit determines to radiate the heat from the radiator to the outside of the vehicle, decide operation amounts of the compressor, the water pump, and the radiator fan such that the operation amounts satisfy the amount of discharged heat of the second thermal circuit calculated by the first calculation unit and the amount of radiated heat of the radiator calculated by the second calculation unit and a sum of power consumption values of the water pump, the compressor, and the radiator fan is minimized.

A heat control method according to a second aspect of the invention is performed in a vehicle including a first thermal circuit including a water pump configured to circulate a coolant, a radiator configured to radiate heat of the coolant to the outside of the vehicle, and a radiator fan configured to increase an amount of air passing through the radiator and a second thermal circuit including a compressor configured to circulate a refrigerant while changing a state of the refrigerant and being able to exchange heat with the first thermal circuit. The heat control method includes: calculating an amount of absorbed heat which is requested by the first thermal circuit and an amount of discharge heat which is requested to be discharged from the second thermal circuit to the first thermal circuit; determining whether to radiate heat from the radiator to the outside of the vehicle; calculating, when determining to radiate the heat from the radiator to the outside of the vehicle, an amount of radiated heat which is requested for the radiator based on the amount of absorbed heat requested by the first thermal circuit and the amount of discharged heat requested by the second thermal circuit; and deciding, when determining to radiate the heat from the radiator to the outside of the vehicle, operation amounts of the compressor, the water pump, and the radiator fan such that the operation amounts satisfy the calculated amount of discharged heat of the second thermal circuit and the calculated amount of radiated heat of the radiator and a sum of power consumption values of the water pump, the compressor, and the radiator fan is minimized.

According to the invention, it is possible to provide a heat control device and a heat control method that can transfer a predetermined amount of heat from a thermal circuit for cooling a passenger compartment to a thermal circuit for circulating a coolant and reduce power consumption which is required for transfer of heat.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

A heat control device according to an embodiment of the invention is provided in a vehicle including a high-temperature cooling circuit that circulates a coolant and a refrigerant circuit that circulates a refrigerant while changing a state of the refrigerant and that is able to exchange heat with the high-temperature cooling circuit. When there is a heat discharge request from the refrigerant circuit, amounts of operation of a plurality of units which are used to discharge heat are determined such that the heat discharge request is satisfied and a sum of power consumption of the units is minimized. Through this control, it is possible to satisfy the heat discharge request of the refrigerant circuit and to reduce power consumption which is required for discharge of heat.

EMBODIMENT

Configuration

Figure 1:
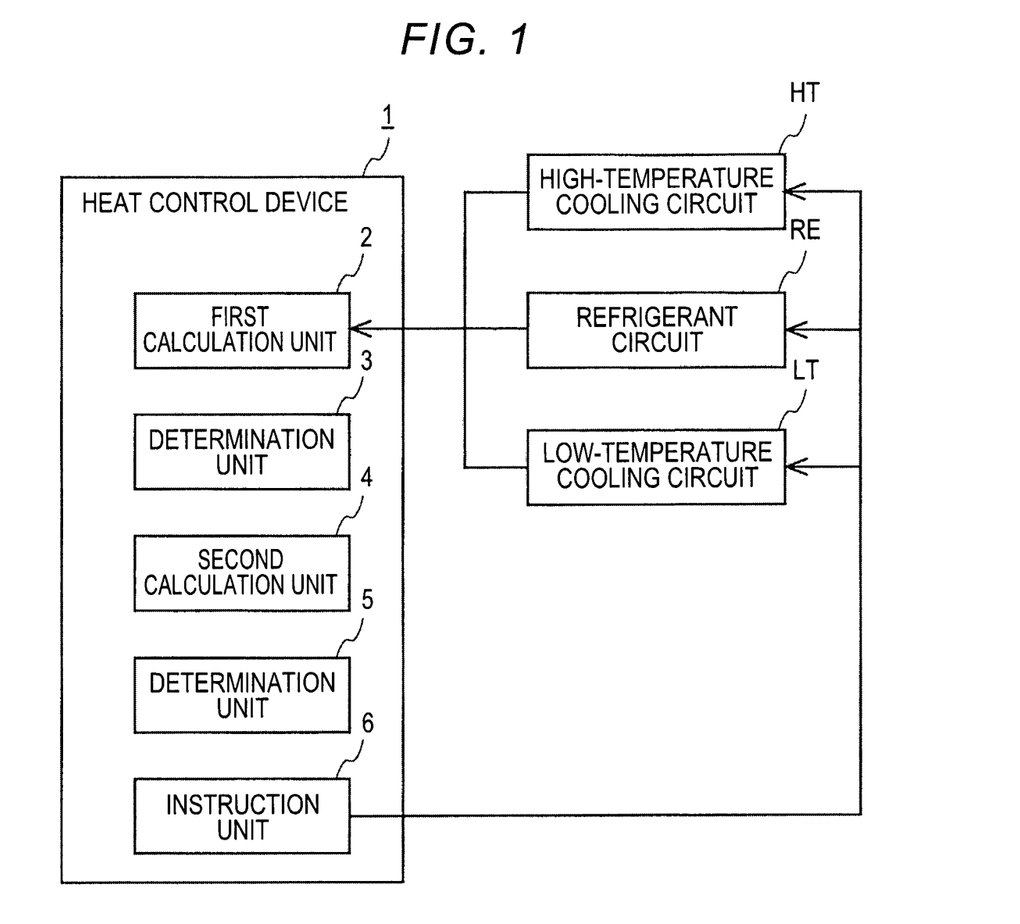
FIG. 1 is a functional block diagram schematically illustrating configurations of a heat control device and thermal circuits according to an embodiment.
Figure 2:
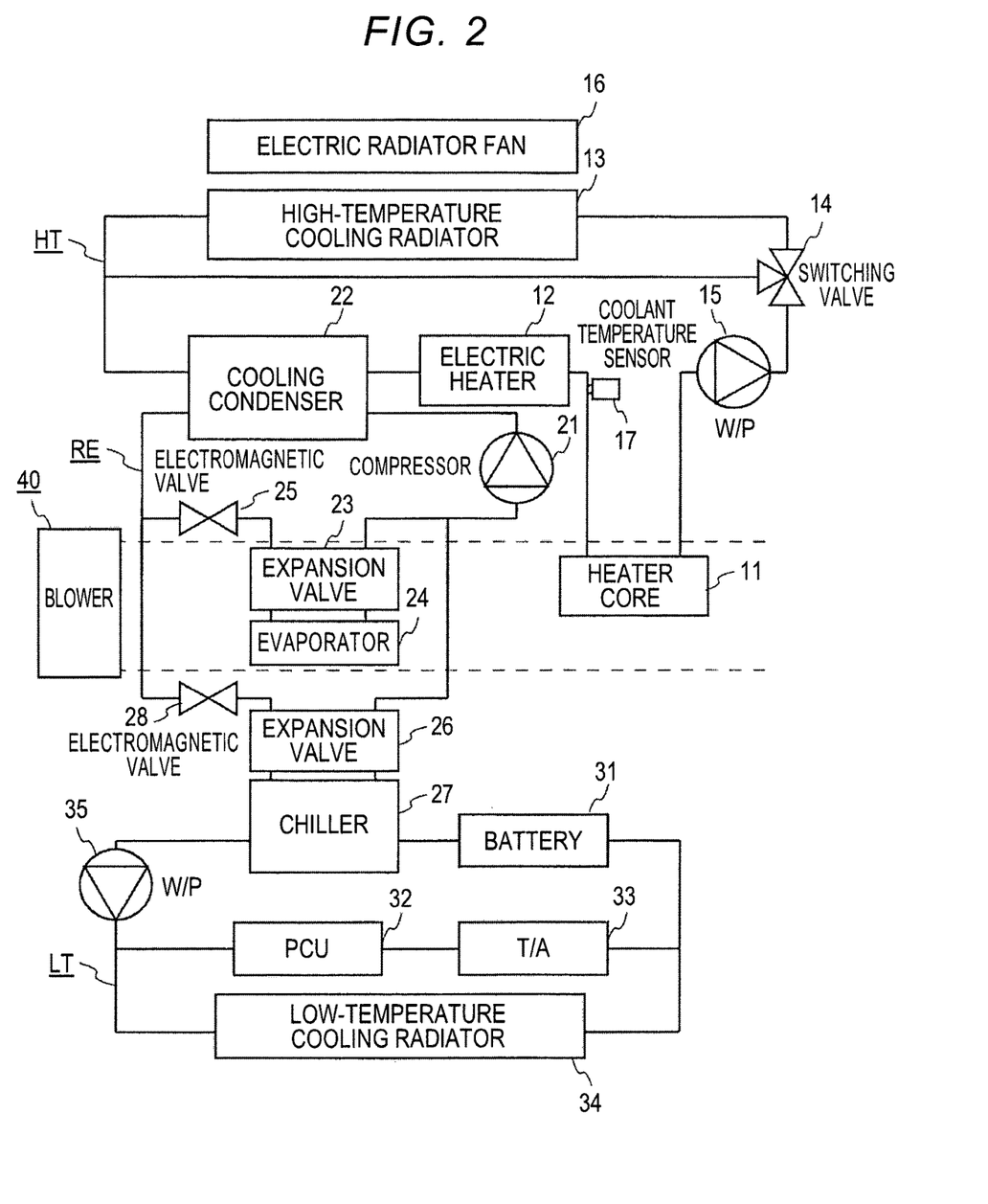
FIG. 2 is a block diagram illustrating an example of configurations of the thermal circuits illustrated in FIG. 1.

FIG. 1 is a functional block diagram schematically illustrating configurations of a heat control device and thermal circuits according to an embodiment. FIG. 2 is a block diagram illustrating an example of configurations of the thermal circuits illustrated in FIG. 1.

The heat control device 1 illustrated in FIG. 1 is a device that is mounted in a vehicle including at least two thermal circuits including a high-temperature cooling circuit HT and a refrigerant circuit RE and controls transfer of heat from the refrigerant circuit RE to the high-temperature cooling circuit HT and discharge of heat from the high-temperature cooling circuit HT to the outside of the vehicle. In this embodiment, a low-temperature cooling circuit LT that cools a battery or the like is additionally provided as a thermal circuit. The high-temperature cooling circuit HT, the refrigerant circuit RE, and the low-temperature cooling circuit LT each include a flow passage for circulating a heat medium.

Referring to FIG. 2, the high-temperature cooling circuit HT is a circuit that circulates a coolant and includes a heater core 11, an electric heater 12, a high-temperature cooling radiator (hereinafter simply referred to as a "radiator") 13, a switching valve 14, a water pump (denoted by "W/P" in the drawing) 15, and an electric radiator fan 16. The high-temperature cooling circuit HT has a function of accumulating heat in a coolant to heat a passenger compartment and a function of radiating heat received from the refrigerant circuit RE by heat exchange to the outside of the vehicle. The heater core 11 is a unit that includes a tube in which a coolant flows and a fin and performs heat exchange between the coolant and air passing through the fin. The electric heater 12 is a unit that heats a coolant when the temperature of the coolant is insufficient. The radiator 13 is a unit that cools a coolant with air, and includes a radiator core that includes a tube in which a coolant flows and a fin and performs heat exchange between air passing through the fin and the coolant. The electric radiator fan 16 is a unit that is provided behind the radiator core of the radiator 13 and forcibly blows air to the radiator core. A grille shutter that increases or decreases an amount of air passing through the radiator core may be provided in front of the radiator core. The water pump 15 is a unit that circulates a coolant in the high-temperature cooling circuit HT. A temperature sensor 17 that measures the temperature of the coolant is provided in the high-temperature cooling circuit HT.

The refrigerant circuit RE is a circuit that circulates a refrigerant while changing the state thereof and includes a compressor 21, a water-cooled condenser 22, an expansion valve 23, an evaporator 24, an electromagnetic valve 25, an expansion valve 26, a chiller 27, and an electromagnetic valve 28. A refrigerant compressed by the compressor 21 is cooled and condensed in the water-cooled condenser 22 using the coolant of the high-temperature cooling circuit HT. In the course of condensation of the refrigerant in the water-cooled condenser 22, heat is discharged from the refrigerant to the coolant of the high-temperature cooling circuit HT. By spraying the refrigerant condensed by the water-cooled condenser 22 from the expansion valve 23 into the evaporator 24 to expand the refrigerant in a state in which the electromagnetic valve 25 is open, heat can be absorbed from air around the evaporator 24. By spraying the refrigerant condensed by the water-cooled condenser 22 from the expansion valve 26 into the chiller 27 to expand the refrigerant in a state in which the electromagnetic valve 28 is open, heat can be absorbed from the coolant of the low-temperature cooling circuit LT. An amount of heat discharged from the refrigerant circuit RE to the high-temperature cooling circuit HT can be controlled depending on the output of the compressor 21 and the output of the water pump 15 of the high-temperature cooling circuit HT.

In the configuration example of the thermal circuits illustrated in FIG. 2, a blower 40 is provided. The blower 40 is a unit that forcibly blows air to one or both of the heater core 11 and the evaporator 24 depending on an air-conditioning state (cooling, heating, dehumidification-heating, or the like) in a passenger compartment.

The low-temperature cooling circuit LT is a circuit that circulates a coolant and includes a battery 31, a power control unit (hereinafter referred to as a "PCU") 32, a transaxle (hereinafter referred to as a "T/A") 33, a radiator 34, and a water pump 35. The battery 31 is a unit that stores electric power which is supplied to a traveling motor. The PCU 32 is a unit that includes an inverter driving the traveling motor and a DCDC converter converting a voltage and controls electric power which is supplied to the traveling motor. The T/A 33 is a unit in which the traveling motor, a power generator, a power split mechanism, and a transmission are incorporated into one body. The radiator 34 is a unit that cools a coolant with air, and includes a radiator core that includes a tube in which a coolant flows and a fin and performs heat exchange between air passing through the fin and the coolant. The radiator 34 may additionally include a grille shutter and/or a radiator fan. The grille shutter is provided in front of the radiator core and increases or decreases an amount of air passing through the radiator core. The radiator fan is provided behind the radiator core and forcibly blows air to the radiator core. The water pump 35 is a unit that circulates a coolant in the low-temperature cooling circuit LT. The low-temperature cooling circuit LT is coupled to the refrigerant circuit RE via the chiller 27 such that heat can be exchanged, and heat of the low-temperature cooling circuit LT can be transferred to the refrigerant circuit RE. An amount of heat transferred from the low-temperature cooling circuit LT to the refrigerant circuit RE can be controlled based on the output of the water pump 35, the opening level of the expansion valve 26 of the refrigerant circuit RE, the output of the compressor 21, and the like.

Since the low-temperature cooling circuit LT is provided to cool the battery 31, the PCU 32, and the T/A 33 and to secure reliability thereof, the temperature of the coolant circulating in the low-temperature cooling circuit LT is normally kept lower than the temperature of the coolant circulating in the high-temperature cooling circuit HT. In the following description, for the purpose of distinction between the coolant in the high-temperature cooling circuit HT and the coolant in the low-temperature cooling circuit LT, the former may be referred to as a "high-temperature coolant" and the latter may be referred to as a "low-temperature coolant."

In FIG. 2, thermal circuits which are mounted in an electric motor-driven vehicle are exemplified, but the heat control device according to this embodiment can be applied to a hybrid vehicle. In a hybrid vehicle, the high-temperature cooling circuit HT can be used to cool an engine.

Referring back to FIG. 1, the heat control device 1 includes a first calculation unit 2, a determination unit 3, a second calculation unit 4, a determination unit 5, and an instruction unit 6. The first calculation unit 2 calculates an amount of discharged heat requested by the water-cooled condenser 22, that is, an amount of discharged heat which is requested to be discharged from the refrigerant circuit RE to the high-temperature cooling circuit HT. The determination unit 3 determines whether heat is to be radiated from the radiator 13 of the high-temperature cooling circuit HT to the outside of the vehicle based on settings of air conditioning or the like. When heat is to be radiated from the radiator 13 to the outside of the vehicle, the determination unit 3 determines whether the electric radiator fan 16 is to be driven based on a predetermined condition. When the determination unit 3 determines that heat is to be radiated from the radiator 13 to the outside of the vehicle, the second calculation unit 4 calculates an amount of radiated heat requested for the radiator 13 based on the amount of absorbed heat requested by the high-temperature cooling circuit HT and the amount of discharged heat which is requested to be discharged from the refrigerant circuit RE to the high-temperature cooling circuit HT via the water-cooled condenser 22. The determination unit 5 determines amounts of operation (amounts of driving) of the compressor 21 of the refrigerant circuit RE, the water pump 15 of the high-temperature cooling circuit HT, and the electric radiator fan 16 based on the result of determination from the determination unit 3 and the results of calculation from the first calculation unit 2 and the second calculation unit 4. The instruction unit 6 instructs controllers of the units to drive the units based on the amounts of operation determined by the determination unit 5.

The heat control device 1 can communicate with units which are included in the thermal circuits via an onboard network and can acquire thermal requests from the units. The thermal requests from the units are information including a value of an amount of absorbed heat requested by each unit or an amount of discharged heat requested by each unit. The amount of absorbed heat or the amount of discharged heat can be expressed by an amount of thermal energy transferred per unit time (power, unit: W).

Control Process

Details of a process flow which is performed by the first calculation unit 2, the determination unit 3, the second calculation unit 4, the determination unit 5, and the instruction unit 6 will be described below with reference to FIGS. 3 to 6B.

Figure 3:
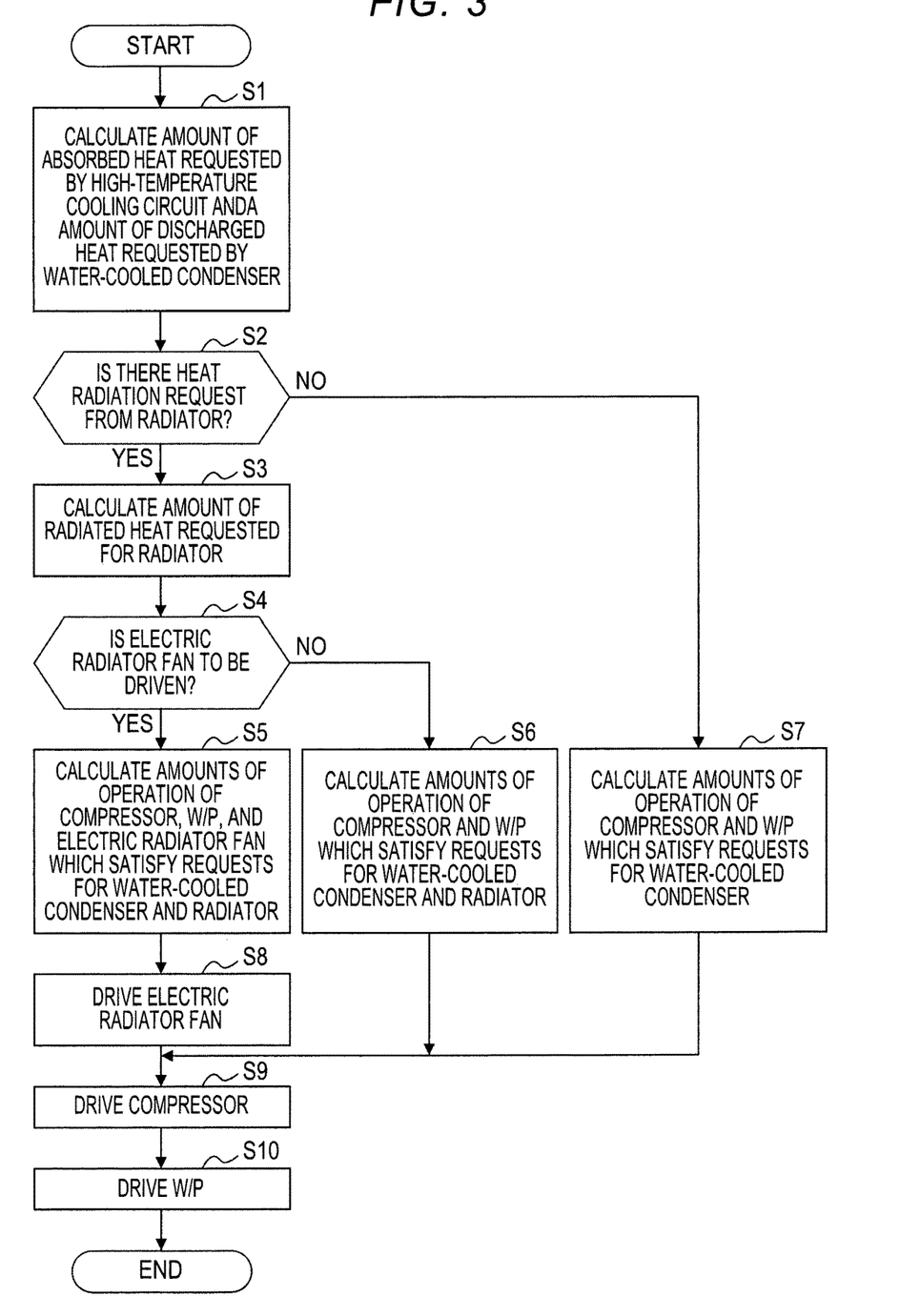
FIG. 3 is a flowchart illustrating a control process which is performed by the heat control device illustrated in FIG. 1.

FIG. 3 is a flowchart illustrating a control process flow which is performed by the heat control device illustrated in FIG. 1. The control process flow illustrated in FIG. 3 is started with starting of the vehicle and is repeatedly performed at intervals of a predetermined time until the operation of the vehicle stops.

Step S1: The first calculation unit 2 calculates an amount of absorbed heat requested by the high-temperature cooling circuit HT and an amount of discharged heat requested by the water-cooled condenser 22. The requested amount of absorbed heat of the high-temperature cooling circuit HT is an amount of absorbed heat which is required for heating the passenger compartment. The requested amount of discharged heat of the water-cooled condenser 22 is an amount of discharged heat which is requested to be discharged from the water-cooled condenser 22 to the high-temperature cooling circuit HT by the refrigerant circuit RE and is a sum of an amount of discharged heat requested by the units of the refrigerant circuit RE for cooling the passenger compartment and an amount of discharged heat requested to be discharged to the refrigerant circuit RE via the chiller 27 by the low-temperature cooling circuit LT for cooling the battery 31 or the like. The amount of discharged heat requested by the units of the refrigerant circuit RE with cooling of the passenger compartment is a sum of an amount of discharged heat generated by compressing the refrigerant in the compressor 21 and an amount of absorbed heat absorbed from the air by the evaporator 24. The first calculation unit 2 acquires the amount of absorbed heat requested by the heater core 11 of the high-temperature cooling circuit HT from the controller of an air conditioner by communication. The first calculation unit 2 acquires the amount of discharged heat requested by the units of the refrigerant circuit RE and the units of the low-temperature cooling circuit LT from the controllers of the units by communication. The first calculation unit 2 calculates an amount of discharged heat requested to be discharged from the water-cooled condenser 22 by the refrigerant circuit RE by adding the amounts of discharged heat requested by the units of the refrigerant circuit RE and the amounts of discharged heat requested by the units of the low-temperature cooling circuit LT. By expressing the amounts of absorbed heat and the amounts of discharged heat as amounts of thermal energy transferred per unit time (power, unit: W), it is possible to easily calculate an amount of discharged heat requested to be discharged from the water-cooled condenser 22 by the refrigerant circuit RE and to easily perform comparison with the amount of absorbed heat requested by the high-temperature cooling circuit HT. Thereafter, the process flow progresses to Step S2.

The amount of absorbed heat requested by the heater core 11 is estimated based on the temperature in the passenger compartment, the temperature of the high-temperature coolant, the set temperature for heating the passenger compartment, and the like by the controller of an air conditioner. The amounts of discharged heat requested by the units of the refrigerant circuit RE are estimated based on the temperature of the passenger compartment, the refrigerant temperature, the set temperature for cooling the passenger compartment, and the like by the controllers of the units. The amounts of discharged heat requested by the units of the low-temperature cooling circuit LT are estimated based on the SOC or the current temperature and a target temperature of the battery 31, the current temperatures and the target temperatures of the PCU 32 and the T/A 33, the temperature of the coolant, and the like by the controllers of the units. The amounts of discharged heat requested by the units can be estimated based on, for example, map data in which temporal change of the amount of absorbed heat or the amount of discharged heat required for changing the temperature of a control target (the air temperature, the coolant temperature, and the like) from a current temperature to a control target value is mapped in advance.

Step S2: The determination unit 3 determines whether heat is to be radiated from the radiator 13 of the high-temperature cooling circuit HT to the outside of the vehicle. For example, at the time of cooling of the passenger compartment, since the temperature of the high-temperature coolant increases by cooling the refrigerant of the refrigerant circuit RE in the water-cooled condenser 22, but heat does not need to be stored in the coolant of the high-temperature cooling circuit HT at the time of cooling of the passenger compartment, the determination unit 3 determines that heat is to be radiated from the radiator 13. At the time of heating of the passenger compartment, since heat is stored in the high-temperature coolant, the determination unit 3 determines that heat is not to be radiated from the radiator 13. At the time of dehumidification-heating of the passenger compartment, discharge heat generated in the refrigerant circuit RE is transferred to the high-temperature cooling circuit HT for the dehumidification and can be used to heat the passenger compartment, but when the amount of discharged heat from the refrigerant circuit RE is greater than the amount of absorbed heat requested by the high-temperature cooling circuit HT (that is, an amount of heat required for heating the passenger compartment), the determination unit 3 determines that heat is to be radiated from the radiator 13 in order to discharge the excessive heat to the outside of the vehicle. The process flow progresses to Step S3 when the determination result of Step S2 is YES, and the process flow progresses to Step S7 otherwise.

Step S3: When the determination unit 3 determines that heat is to be radiated from the radiator 13 to the outside of the vehicle, the second calculation unit 4 calculates an amount of radiated heat requested for the radiator 13, that is, an amount of heat which is radiated from the radiator 13. The requested amount of radiated heat of the radiator 13 can be calculated based on an amount of absorbed heat requested by the high-temperature cooling circuit HT and an amount of discharged heat requested to be discharged to the high-temperature cooling circuit HT via the water-cooled condenser 22 by the refrigerant circuit RE. For example, at the time of cooling of the passenger compartment, since the amount of absorbed heat requested by the high-temperature cooling circuit HT is zero, the amount of discharged heat requested by the water-cooled condenser 22 calculated in Step S1 is the amount of radiated heat requested for the radiator 13. At the time of dehumidification-heating of the passenger compartment, a difference between the amount of radiated heat requested by the water-cooled condenser 22 calculated in Step S1 and the amount of absorbed heat requested by the high-temperature cooling circuit HT is the amount of radiated heat requested for the radiator 13. Thereafter, the process flow progresses to Step S4.

Step S4: The determination unit 3 determines whether the electric radiator fan 16 is to be driven. When the heat radiation capacity of the radiator 13 is low, it is possible to increase a speed of air passing through the radiator 13 and to improve the heat radiation capacity by driving the electric radiator fan 16. The determination condition of Step S4 can be set based on the temperature of the high-temperature coolant and the vehicle speed. For example, when the temperature of the high-temperature coolant is equal to or greater than a predetermined threshold value T1 and the vehicle speed is equal to or less than a predetermined threshold value V1, the determination unit 3 may determine that the electric radiator fan 16 is to be driven. In this case, when the vehicle speed is greater than the predetermined threshold value V1 and the temperature of the high-temperature coolant is equal to or greater than a predetermined threshold value T2 (where T2>T1), the determination unit 3 may determine that the electric radiator fan 16 is to be driven. The process flow progresses to Step S5 when the determination result of Step S4 is YES, and the process flow progresses to Step S6 otherwise.

Step S5: The amounts of operation of the compressor 21, the water pump 15, and the electric radiator fan 16 are determined such that the amount of discharged heat requested by the water-cooled condenser 22 which is calculated in Step S1 and the amount of radiated heat requested for the radiator 13 which is calculated in Step S3 are satisfied and the sum of the power consumption values of the compressor 21 of the refrigerant circuit RE, the water pump 15 and the electric radiator fan 16 of the high-temperature cooling circuit HT is minimized.

Figure 4:
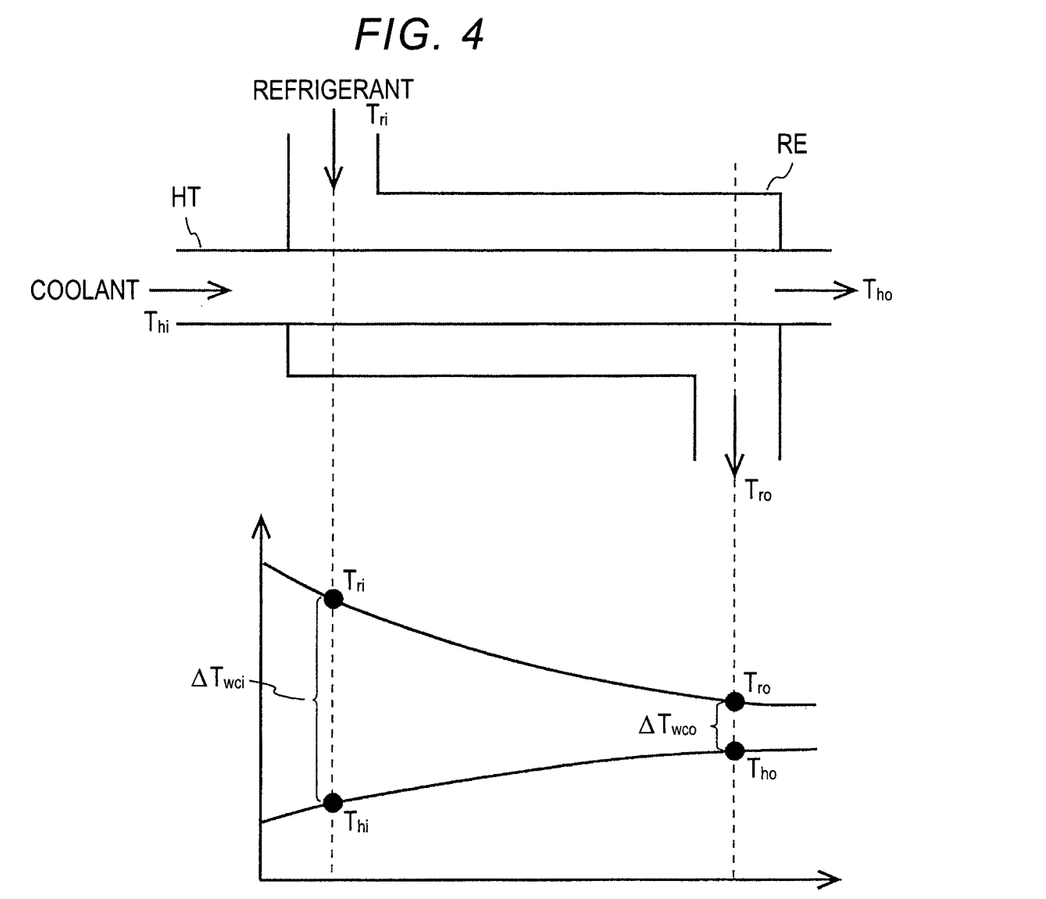
FIG. 4 is a diagram schematically illustrating a configuration of a water-cooled condenser.

A configuration of the water-cooled condenser is schematically illustrated in FIG. 4. In the water-cooled condenser 22, an inlet temperature of the high-temperature coolant is defined as $T_{hi}$, an outlet temperature of the high-temperature coolant is defined as $T_{ho}$, an inlet temperature of the refrigerant is defined as $T_{ri}$, an outlet temperature of the refrigerant is defined as $T_{ro}$, a temperature difference between the refrigerant and the high-temperature coolant at a refrigerant inlet is defined as $\Delta T_{wci}$, and a temperature difference between the refrigerant and the high-temperature coolant at a refrigerant outlet is defined as $\Delta T_{wco}$. In this case, an amount of heat $Q_{wc}$ discharged from the water-cooled condenser 22 (a total amount of transferred heat) $Q_{wc}$ is expressed by Equation 1. The temperature difference between the refrigerant and the high-temperature coolant $\Delta T_{wc}$ (a logarithmic mean temperature difference) and a heat transfer coefficient $K_{wc}$ of the water-cooled condenser 22 are respectively expressed by Equations 2 and 3.

$$Q_{wc} = K_{wc} \times A_{wc} \times \Delta T_{wc} \qquad \text{Equation 1}$$

$$\Delta T_{wc} = \frac{\Delta T_{wco} - \Delta T_{wci}}{\ln \frac{\Delta T_{wco}}{\Delta T_{wci}}} \qquad \text{Equation 2}$$

$$\Delta T_{wc} = \frac{\Delta T_{wco} - \Delta T_{wci}}{\ln \frac{\Delta T_{wco}}{\Delta T_{wci}}} \qquad \text{Equation 3}$$

Here, the reference signs are as follows:
- $Q_{wc}$: an amount of radiated heat of the water-cooled condenser 22;
- $K_{wc}$: a heat transfer coefficient of the water-cooled condenser 22;
- $A_{wc}$: a heat transfer area of the water-cooled condenser 22;
- $\Delta T_{wc}$: a temperature difference between the refrigerant and the high-temperature coolant;
- $\Delta T_{wci}$: a temperature difference between the refrigerant and the high-temperature coolant at the refrigerant inlet;
- $\Delta T_{wco}$: a temperature difference between the refrigerant and the high-temperature coolant at the refrigerant outlet;
- $h_{re}$: a heat transfer coefficient on the refrigerant circuit RE side; and
- $h_{ht}$: a heat transfer coefficient on the high-temperature cooling circuit HT side.

Figure 5:
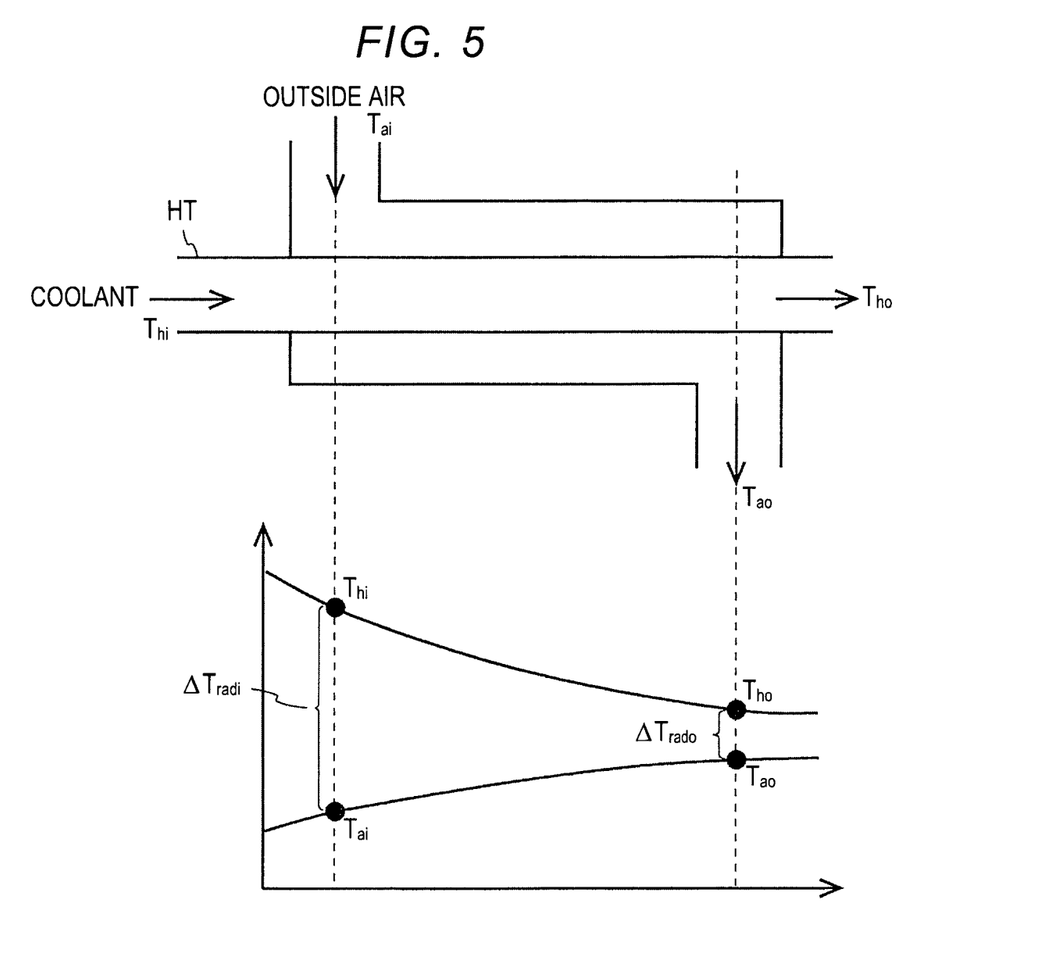
FIG. 5 is a diagram schematically illustrating a configuration of a radiator.

A configuration of the radiator is schematically illustrated in FIG. 5. In the radiator 13, an inlet temperature of the high-temperature coolant is defined as $T_{hi}$, an outlet temperature of the high-temperature coolant is defined as $T_{ho}$, an inlet temperature of the outside air is defined as $T_{ai}$, an outlet temperature of the outside air is defined as $T_{ao}$, a temperature difference between the high-temperature coolant and the outside air at a high-temperature coolant inlet is defined as $\Delta T_{radi}$, and a temperature difference between the high-temperature coolant and the outside air at a high-temperature coolant outlet is defined as $\Delta T_{rado}$. In this case, an amount of heat radiated from the radiator 13 (a total amount of transferred heat) $Q_{rad}$ is expressed by Equation 4. The temperature difference ad between the high-temperature coolant and the outside air $\Delta T_{rad}$ (a logarithmic mean temperature difference) and a heat transfer coefficient $K_{rad}$ of the radiator 13 are respectively expressed by Equations 5 and 6.

$$Q_{rad} = K_{rad} \times A_{rad} \times \Delta T_{rad} \qquad \text{Equation 4}$$

$$\Delta T_{wc} = \frac{\Delta T_{wco} - \Delta T_{wci}}{\ln\frac{\Delta T_{wco}}{\Delta T_{wci}}} \qquad \text{Equation 5}$$

$$\frac{1}{K_{rad}} = \frac{1}{h_{ht}} + \frac{1}{h_{rd}} \qquad \text{Equation 6}$$

Here, the reference signs are as follows:
 $Q_{rad}$: an amount of radiated heat of the radiator 13;
 $K_{rad}$: a heat transfer coefficient of the radiator 13;
 $A_{rad}$: a heat transfer area of the radiator 13;
 $\Delta T_{rad}$: a temperature difference between the high-temperature coolant and the outside air;
 $\Delta T_{radi}$: a temperature difference between the high-temperature coolant and the outside air at the high-temperature coolant inlet;
 $\Delta T_{rado}$: a temperature difference between the high-temperature coolant and the outside air at the high-temperature coolant outlet;
 $h_{ht}$: a heat transfer coefficient on the high-temperature cooling circuit HT side; and
 $h_{rd}$: a heat transfer coefficient on the outside air side.

As expressed by Equations 1 to 3, the amount of radiated heat of the water-cooled condenser 22 is determined by the temperature difference between the refrigerant and the high-temperature coolant, the heat transfer area, and the heat transfer coefficients of the refrigerant circuit RE side and the high-temperature cooling circuit HT side. The heat transfer coefficients of the refrigerant circuit RE side and the high-temperature cooling circuit HT side depend on flow rates (flow speeds) of the refrigerant and the high-temperature coolant. As expressed by Equations 4 to 6, the amount of radiated heat of the radiator 13 is determined by the temperature difference between the high-temperature coolant and the outside air, the heat transfer area, and the heat transfer coefficients of the high-temperature cooling circuit side and the outside air side. The heat transfer coefficients of the high-temperature cooling circuit HT side and the outside air side depend on flow rates (flow speeds) of the high-temperature coolant and an air speed passing through the radiator 13. The amount of discharged heat of the water-cooled condenser 22 and the amount of radiated heat of the radiator 13 can be controlled by a combination of the amounts of operation of the compressor 21, the water pump 15, and the electric radiator fan 16, and there is a plurality of combinations of the amounts of operation of the compressor 21, the water pump 15, and the electric radiator fan 16 satisfying the amount of discharged heat requested by the water-cooled condenser 22 and the amount of radiated heat requested by the radiator 13.

Figure 6A:
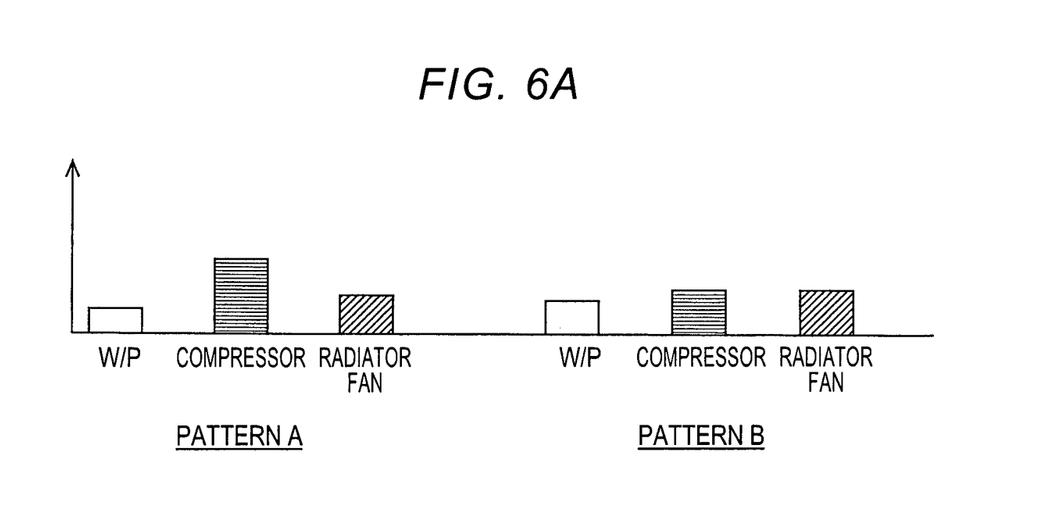
FIG. 6A is a diagram illustrating an example of a combination of power consumption in units which are driven to discharge heat generated in a refrigerant circuit to the outside of a vehicle.
Figure 6B:
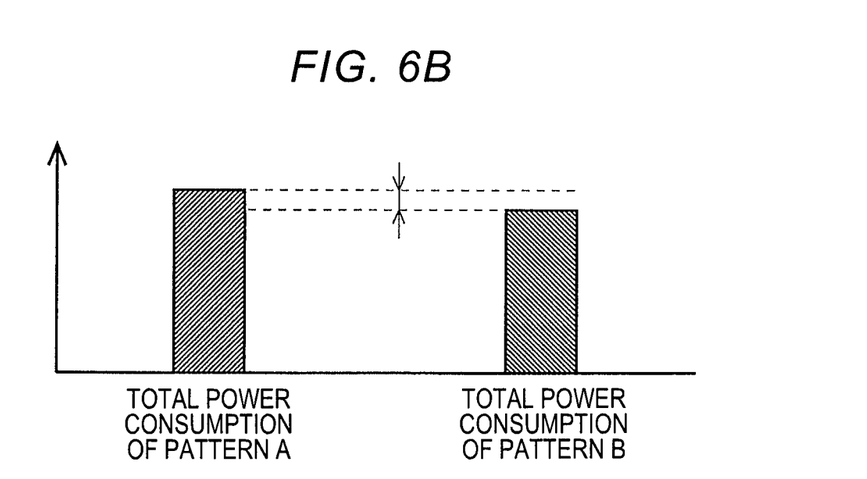
FIG. 6B is a diagram illustrating sums of power consumption in pattern A and pattern B illustrated in FIG. 6A.

FIG. 6A is a diagram illustrating an example of a combination of power consumption in units which are driven to discharge heat generated in the refrigerant circuit to the outside of the vehicle. FIG. 6B is a diagram illustrating the sum of power consumption in pattern A and pattern B illustrated in FIG. 6A. In FIGS. 6A and 6B, the vertical axis represents power consumption of each unit. Since the power consumption of each unit has a positive correlation with the amount of operation (the output) of the corresponding unit, greater power consumption in each unit means the greater amount of operation in FIGS. 6A and 6B.

For example, combinations of the amounts of operation of the water pump 15, the electric radiator fan 16, and the compressor 21 satisfying the same requested amount of discharged heat of the water-cooled condenser 22 and the same requested amount of radiated heat of the radiator 13 include pattern A and pattern B illustrated in FIG. 6A. Pattern A is a combination of the mounts of operation of the units such that the power consumption of the compressor 21 becomes relatively greater. Pattern B is a combination of the amounts of operation of the units such that the power consumption values of the water pump 15, the electric radiator fan 16, and the compressor 21 become almost the same. The amounts of operation of the water pump 15, the electric radiator fan 16, and the compressor 21 can satisfy the amounts of radiated heat requested by the water-cooled condenser 22 and the radiator 13 in any of pattern A and pattern B, but the sum of the power consumption values of the water pump 15, the electric radiator fan 16, and the compressor 21 differs between pattern A and pattern B as illustrated in FIG. 6B. In the example illustrated in FIGS. 6A and 6B, power consumption required for satisfying the thermal request from the vehicle as a whole can be further reduced by employing pattern B.

Therefore, in Step S5, the determination unit 5 calculates the amounts of operation of the units such that the requested amount of discharged heat of the water-cooled condenser 22 and the requested amount of radiated heat of the radiator 13 are satisfied and the sum of the power consumption values of the compressor 21, the water pump 15, and the electric radiator fan 16 is minimized. Specifically, first, the determination unit 5 calculates the power consumption values of the compressor 21, the water pump 15, and the electric radiator fan 16 that minimize the sum of the power consumption values of the compressor 21, the water pump 15, and the electric radiator fan 16 under the condition that the amount of discharged heat of the water-cooled condenser 22 and the amount of radiated heat of the radiator 13 which are determined by a combination of the power consumption values of the compressor 21, the water pump 15, and the electric radiator fan 16 are equal to or greater than the requested amount of discharged heat of the water-cooled condenser 22 calculated in Step S1 and the requested amount of radiated heat of the radiator 13 calculated in Step S3. Calculation of the power consumption values of the units in Step S5 can be understood as an optimization problem for minimizing J which is expressed by Equation 7. Constraints in Step S5 simultaneously satisfy Equations 8 and 9. Since the amount of discharged heat (the amount of radiated heat) Q is a function of power consumption W, map data indicating a relationship between Q and W can be acquired by experiment in advance and an optimal solution can be calculated using a linear programming method, a genetic algorithm, or the like. When map data is acquired by experiment, an experimental design method may be used. Then, the determination unit 5 determines the amounts of operation of the compressor 21, the water pump 15, and the electric radiator fan 16 such that the power consumption values of the compressor 21, the water pump 15, and the electric radiator fan 16 become the calculated optimal solution of power consumption. The amounts of operation of the compressor 21, the water pump 15, and the electric radiator fan 16 can be calculated based on a relationship between an amount of operation and power consumption which is acquired in advance by experiment. When an optimal combination of the amounts of operation of the units is known by experiment, the amounts of operation of the units may be uniquely determined from map data acquired by experiment without using optimal calculation. Thereafter, the process flow progresses to Step S8.

$$J = W_{wp} + W_{cp} + W_{rdf} \qquad \text{Equation 7}$$

$$Q_{wc} - \overline{Q_{wc}} \geq 0 \qquad \text{Equation 8}$$

$$Q_{rad} - \overline{Q_{rad}} \geq 0 \qquad \text{Equation 9}$$

Here, the reference signs are as follows:
- $W_{wp}$: power consumption of the water pump 15;
- $W_{cp}$: power consumption of the compressor 21;
- $W_{rdf}$: power consumption of the electric radiator fan 16;
- $Q_{wc}$: an amount of discharged heat of the water-cooled condenser 22;
- $Q_{wc}$ bar: a requested amount of discharged heat of the water-cooled condenser 22;
- $Q_{rad}$: an amount of radiated heat of the radiator 13; and
- $Q_{rad}$ bar: a requested amount of radiated heat of the radiator 13.

Step S6: The determination unit 5 calculates the amounts of operation of the units such that the requested amount of discharged heat of the water-cooled condenser 22 and the requested amount of radiated heat of the radiator 13 are satisfied and the sum of the power consumption values of the compressor 21 and the water pump 15 is minimized. Specifically, first, the determination unit 5 calculates the power consumption values of the compressor 21 and the water pump 15 that minimize the sum of the power consumption values of the compressor 21 and the water pump 15 under the condition that the amount of discharged heat of the water-cooled condenser 22 and the amount of radiated heat of the radiator 13 which are determined by a combination of the power consumption values of the compressor 21 and the water pump 15 are respectively equal to or greater than the requested amount of discharged heat of the water-cooled condenser 22 calculated in Step S1 and the requested amount of radiated heat of the radiator 13 calculated in Step S3. Calculation of the power consumption values of the units in Step S6 can be understood as an optimization problem for minimizing J which is expressed by Equation 10. Constraints in Step S6 simultaneously satisfy Equations 11 and 12. Since the amount of discharged heat (the amount of radiated heat) Q is a function of power consumption W, map data indicating a relationship between Q and W can be acquired by experiment in advance and an optimal solution can be calculated using a linear programming method, a genetic algorithm, or the like. When map data is acquired by experiment, an experimental design method may be used. Then, the determination unit 5 determines the amounts of operation of the compressor 21 and the water pump 15 such that the power consumption values of the compressor 21 and the water pump 15 become the calculated optimal solution of power consumption. The amounts of operation of the compressor 21 and the water pump 15 can be calculated based on a relationship between an amount of operation and power consumption which is acquired in advance by experiment as described above. When an optimal combination of the amounts of operation of the units is known by experiment, the amounts of operation of the units may be uniquely determined from map data acquired by experiment without using optimal calculation. The determination unit 5 determines the calculated optimal solutions as the amounts of operation of the compressor 21 and the water pump 15, and the process flow progresses to Step S9.

$$J = W_{wp} + W_{cp} \qquad \text{Equation 10}$$

$$Q_{wc} - \overline{Q_{wc}} \geq 0 \qquad \text{Equation 11}$$

$$Q_{rad} - \overline{Q_{rad}} \geq 0 \qquad \text{Equation 12}$$

Here, the reference signs are as follows:
- $W_{wp}$: power consumption of the water pump 15;
- $W_{cp}$: power consumption of the compressor 21;
- $Q_{wc}$: an amount of discharged heat of the water-cooled condenser 22;
- $Q_{wc}$ bar: a requested amount of discharged heat of the water-cooled condenser 22;
- $Q_{rad}$: an amount of radiated heat of the radiator 13; and
- $Q_{rad}$ bar: a requested amount of radiated heat of the radiator 13.

Since the process of Step S6 is performed when it is determined in Step S4 that the electric radiator fan 16 is not to be driven, the power consumption value of the electric radiator fan 16 in this case is zero. Accordingly, satisfying of the optimization conditions in Step S6 has the same meaning as the sum of the power consumption values of the compressor 21, the water pump 15, and the electric radiator fan 16 is minimized.

Step S7: The determination unit 5 calculates the amounts of operation of the units such that the requested amount of discharged heat of the water-cooled condenser 22 is satisfied and the sum of the power consumption values of the compressor 21 and the water pump 15 is minimized. Specifically, first, the determination unit 5 calculates the power consumption values of the compressor 21 and the water pump 15 that minimize the sum of the power consumption values of the compressor 21 and the water pump 15 under the condition that the amount of discharged heat of the water-cooled condenser 22 which is determined by a combination of the power consumption values of the compressor 21 and the water pump 15 is equal to or greater than the requested amount of discharged heat of the water-cooled condenser 22 calculated in Step S1. Calculation of the power consumption values of the units in Step S7 can be understood as an optimization problem for minimizing J which is expressed by Equation 13. Constraints in Step S7 satisfy Equation 14. Since the amount of discharged heat (the amount of radiated heat) Q is a function of power consumption W, map data indicating a relationship between Q and W can be acquired by experiment in advance and an optimal solution can be calculated using a linear programming method, a genetic algorithm, or the like. When map data is acquired by experiment, an experimental design method may be used. Then, the determination unit 5 determines the amounts of operation of the compressor 21 and the water pump 15 such that the power consumption values of the compressor 21 and the water pump 15 become the calculated optimal solution of power consumption. The amounts of operation of the compressor 21 and the water pump 15 can be calculated based on a relationship between an amount of operation and power consumption which is acquired in advance by experiment as described above. When an optimal combination of the amounts of operation of the units is known by experiment, the amounts of operation of the units may be uniquely determined from map data acquired by experiment without using optimal calculation. The determination unit 5 determines the calculated optimal solutions as the amounts of operation of the compressor 21 and the water pump 15, and the process flow progresses to Step S9.

$$J = W_{wp} + W_{cp} \qquad \text{Equation 13}$$

$$Q_{wc} - \overline{Q_{wc}} \geq 0 \qquad \text{Equation 14}$$

Here, the reference signs are as follows:
$W_{wp}$: power consumption of the water pump 15;
$W_{cp}$: power consumption of the compressor 21;
$Q_{wc}$: an amount of discharged heat of the water-cooled condenser 22; and
$Q_{wc}$ bar: a requested amount of discharged heat of the water-cooled condenser 22.

Inequalities in the constraints in Equations 8, 9, 11, 12, and 14 comply to a general description method in the optimization problem. In the optimization conditions in Steps S5 to S7, since the amount of discharged heat (the amount of radiated heat) Q is generally a monotonic non-decreasing function of power consumption W of the units, equalities in the constraints are generally satisfied by minimizing the value of J.

Step S8: The instruction unit 6 instructs the controller of the electric radiator fan 16 to drive the electric radiator fan 16 based on the amount of operation determined in Step S5. Thereafter, the process flow progresses to Step S9.

Step S9: The instruction unit 6 instructs the controller of compressor 21 to drive the compressor 21 based on the amount of operation determined in Steps S5 to S7. Thereafter, the process flow progresses to Step S10.

Step S10: The instruction unit 6 instructs the controller of the water pump 15 to drive the water pump 15 based on the amount of operation determined in Steps S5 to S7. Thereafter, the process flow end.

Advantages or the Like

As described above, when there is a heat discharge request from the refrigerant circuit RE, the heat control device 1 according to this embodiment determines amounts of operation of units which are to be driven such that the heat discharge request is satisfied and the sum of power consumption values of units which are driven to transfer heat from the refrigerant circuit RE to the high-temperature cooling circuit HT and units which are driven to discharge heat from the high-temperature cooling circuit HT to the outside of the vehicle if necessary is minimized. Accordingly, it is possible to reduce power consumption which is required for transfer of heat while transferring a desired amount of heat from the refrigerant circuit RE to the high-temperature cooling circuit HT.

By unifying an amount of absorbed heat and an amount of discharged heat which are used for the heat control device 1 to perform a control process into an amount of thermal energy transferred per unit time, it is possible to easily perform collection of thermal requests.

In the above-mentioned embodiment, the amounts of absorbed heat or the amounts of discharged heat of the units and the thermal circuits are expressed by amounts of thermal energy transferred per unit time (in units of W), but the amounts of absorbed heat or the amounts of discharged heat of the units and the thermal circuits may be expressed by amounts of thermal energy (in units of J) required for a predetermined control time.

The heat control device 1 according to this embodiment can be realized by causing a computer including a processor, a storage device such as a ROM and a RAM, and an input and output interface to read a program stored in the storage device and to execute the program. In this case, by causing the processor to execute the program, the functions of the first calculation unit 2, the determination unit 3, the second calculation unit 4, the determination unit 5, and the instruction unit 6 illustrated in FIGS. 1 and 3 can be embodied. The computer may be a dedicated ECU for control of an amount of heat or may be an existing ECU which is mounted in a vehicle. In this embodiment, the heat control device 1 has been described above, but the invention can also be understood as a non-transitory computer-readable recording medium which is materialized and in which the program for performing the process flow illustrated in FIG. 3 is stored or a method of controlling an amount of heat by performing the process flow illustrated in FIG. 3.

The invention can be used as a heat control device that controls transfer of heat from a refrigerant circuit which is provided in a vehicle.

The invention claimed is:

1. A heat control device that is mounted in a vehicle including
   a first thermal circuit including a water pump configured to circulate a coolant, a radiator configured to radiate heat of the coolant to an outside of the vehicle, and a radiator fan configured to increase an amount of air passing through the radiator, and
   a second thermal circuit including a compressor configured to circulate a refrigerant while changing a state of the refrigerant and to exchange heat with the first thermal circuit,
   the heat control device comprising processing circuitry configured to:
      calculate an amount of absorbed heat which is requested by the first thermal circuit and an amount of discharge heat which is requested to be discharged from the second thermal circuit to the first thermal circuit;
      determine whether to radiate the heat from the radiator to the outside of the vehicle and whether to drive the radiator fan based on a temperature of a high-temperature coolant and a vehicle speed; and
      in response to determining to radiate the heat from the radiator to the outside of the vehicle;
         calculate an amount of radiated heat which is requested for the radiator based on the amount of absorbed heat requested by the first thermal circuit and the amount of discharged heat requested by the second thermal circuit;
         determine operation amounts of the compressor, the water pump, and the radiator fan such that the operation amounts satisfy the amount of discharged heat of the second thermal circuit and the amount of radiated heat of the radiator, and a sum of power consumption values of the water pump, the compressor, and the radiator fan is minimized;
         calculate power consumption values of the compressor and the radiator fan which minimize the sum of the power consumption values of the water pump, the compressor, and the radiator fan under conditions that an amount of discharged heat of the second thermal circuit and an amount of radiated heat of the radiator which are determined by a combination of the power consumption values of the water pump, the compressor, and the radiator fan are respectively equal to or greater than the amount of discharge heat of the second thermal circuit and the amount of radiated heat of the radiator; and determine the operation amounts of the water pump, the compressor, and the radiator fan such that the power consumption values of the water pump, the compressor, and the radiator fan become the calculated power consumption values.

2. The heat control device according to claim 1, wherein the processing circuitry is further configured to, in response to determining to radiate the heat from the radiator to the outside of the vehicle, determine the operation amounts of the water pump and the compressor such that the operation amounts satisfy the amount of discharged heat of the second thermal circuit, and a sum of power consumption values of the water pump and the compressor is minimized.

3. The heat control device according to claim 2, wherein the processing circuitry is further configured to, in response to determining to not radiate the heat from the radiator to the outside of the vehicle:

calculate power consumption values of the water pump and the compressor which minimize the sum of the power consumption values of the water pump and the compressor under conditions that an amount of discharged heat of the second thermal circuit which is determined by a combination of the power consumption values of the water pump and the compressor is equal to or greater than the amount of discharge heat of the second thermal circuit; and determine the operation amounts of the water pump and the compressor such that the power consumption values of the water pump and the compressor become the calculated power consumption values.

4. A heat control method performed in a vehicle including
a first thermal circuit including a water pump configured to circulate a coolant, a radiator configured to radiate heat of the coolant to an outside of the vehicle, and a radiator fan configured to increase an amount of air passing through the radiator, and
a second thermal circuit including a compressor configured to circulate a refrigerant while changing a state of the refrigerant and being able to exchange heat with the first thermal circuit, the heat control method comprising:

calculating an amount of absorbed heat which is requested by the first thermal circuit and an amount of discharge heat which is requested to be discharged from the second thermal circuit to the first thermal circuit;

determining whether to radiate heat from the radiator to the outside of the vehicle and whether to drive the radiator fan based on a temperature of a high-temperature coolant and a vehicle speed; and in response to determining to radiate the heat from the radiator to the outside of the vehicle:

calculating an amount of radiated heat which is requested for the radiator based on the amount of absorbed heat requested by the first thermal circuit and the amount of discharged heat requested by the second thermal circuit;

determining operation amounts of the compressor, the water pump, and the radiator fan such that the operation amounts satisfy the calculated amount of discharged heat of the second thermal circuit and the calculated amount of radiated heat of the radiator, and a sum of power consumption values of the water pump, the compressor, and the radiator fan is minimized;

calculating power consumption values of the compressor and the radiator fan which minimize the sum of the power consumption values of the water pump, the compressor, and the radiator fan under conditions that an amount of discharged heat of the second thermal circuit and an amount of radiated heat of the radiator which are determined by a combination of the power consumption values of the water pump, the compressor, and the radiator fan are respectively equal to or greater than the amount of discharge heat of the second thermal circuit and the amount of radiated heat of the radiator; and determining the operation amounts of the water pump, the compressor, and the radiator fan such that the power consumption values of the water pump, the compressor, and the radiator fan become the calculated power consumption values.

* * * * *